Sept. 23, 1952     T. E. PARROTT     2,611,386
TIRE DEFLATING VALVE WITH PRESSURE GAUGE
Filed Feb. 21, 1947
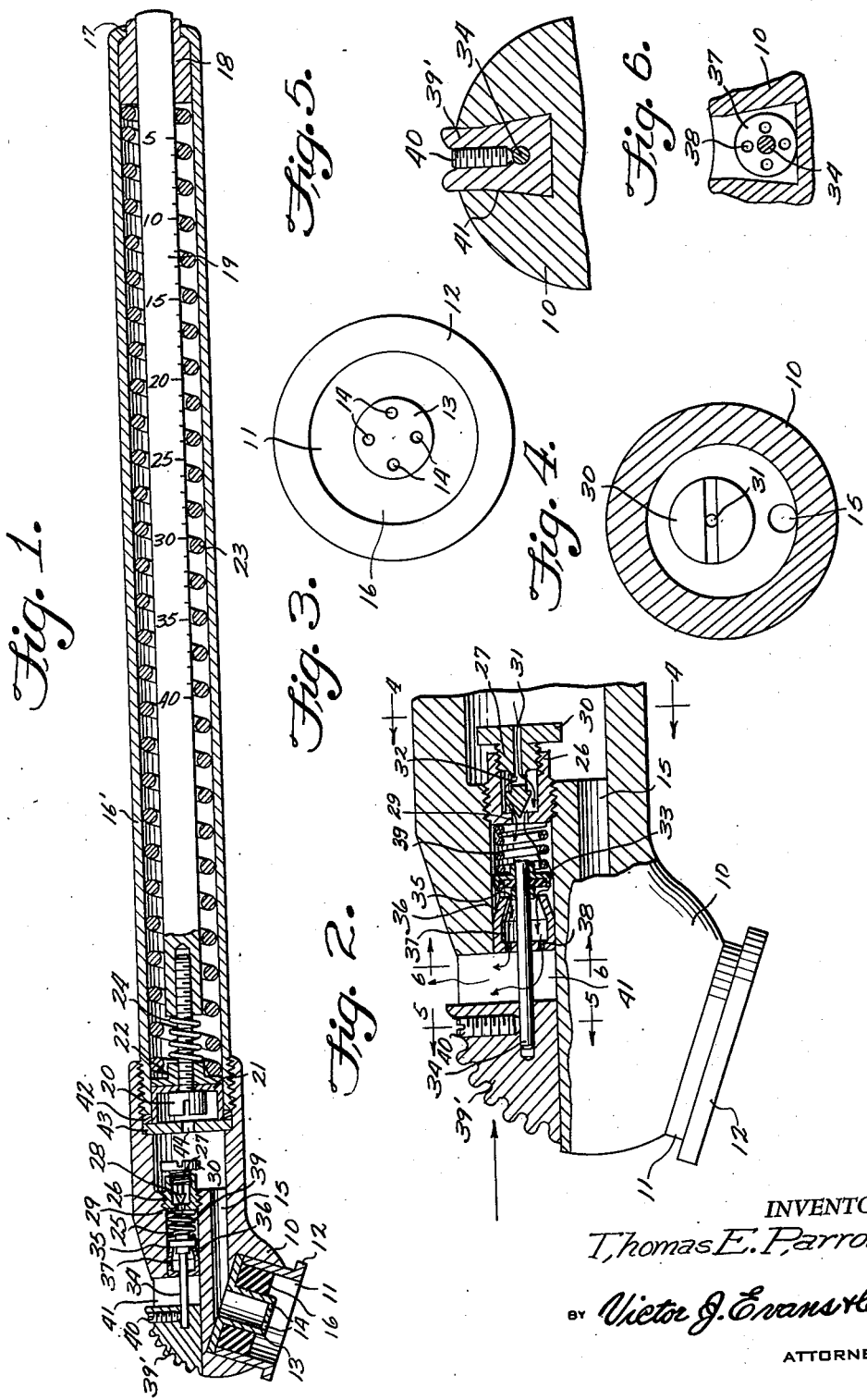
INVENTOR.
Thomas E. Parrott,
BY Victor J. Evans & Co.
ATTORNEYS Patented Sept. 23, 1952

2,611,386

UNITED STATES PATENT OFFICE 2,611,386

TIRE DEFLATING VALVE WITH PRESSURE GAUGE

Thomas E. Parrott, Tulsa, Okla.

Application February 21, 1947, Serial No. 729,985

1 Claim. (Cl. 137—228)

This invention relates to tire gauges for testing the pressure of air in pneumatic tires.

An object of the invention is to provide a valve structure for a gauge that will register the pressure of a pneumatic tire at all times when in use, either upon the deflation or inflation thereof.

In the device embodying the present invention, the gauge will register the amount of air that escapes, so that the user thereof knows the exact amount of air pressure that is in the tire at all times.

With the above and other objects and advantages in view, the invention consists of the novel details of construction, arrangement and combination of parts more fully hereinafter described, claimed and illustrated in the accompanying drawing in which:

Figure 1 is a longitudinal sectional view of an embodiment of the invention;

Figure 2 is an enlarged detailed view, partly in elevation, and partly in section, of the chuck end of the gauge;

Figure 3 is a plan view of the chuck end;

Figure 4 is a sectional view on the line 4—4 of Figure 2;

Figure 5 is a sectional view on the line 5—5 of Figure 2 and

Figure 6 is a sectional view on the line 6—6 of Figure 2.

Referring more in detail to the drawing, the reference numeral 10 designates the air chuck having the inlet end 11 bounded by the annular flange 12. The inlet end 11 is provided with the valve depressing projection 13 which is provided with the relatively spaced air inlet openings 14, where the projection 13 communicates with the air inlet passage 15 in the chuck 10. A rubber jacket 16 surrounding the projection provides an air tight seal between the valve stem and chuck.

Threadedly connected to the outlet end of the chuck is the tubular air chamber 16', which is apertured at 17 at its opposite end to mount the gauge guide 18 and permit the gauge 19 to extend outwardly of the chamber 16' to indicate by the proper indicia thereon, the pressure in the pneumatic tire being tested.

A screw 20 connects the cup washer 21 and cup washer supporting disc 22, to the inner end of the gauge 19, and a heavy spring 23 surrounds the gauge 19 and abuts the guide 18 at its outer end, and the disc 22 at its inner end, while a smaller spring 24 surrounds the screw 20 intermediate of the disc 22, and the inner end of gauge 19, and the tension of these springs is adjusted to properly indicate the pressure in the tire to be tested.

Within the chuck 10, and parallel to the passage 15, is a bore 25 in which is threadedly mounted the cup-shaped valve housing 26, in which is threadedly mounted the outlet valve 27 having the conical shaped valve head 28, which is adapted to be adjusted with relation to the valve seat 29 in the housing 26. The adjustment of the valve 27 with relation to the valve seat 29 is very important. If too much air escapes past the valve 27 air pressure will show excessive drop when the relief valve is opened. If not enough air is passing through the valve 27 it will take a longer period of time to reduce the pressure in the tire to the proper level. However, proper adjustment of the valve 27 will overcome both of these drawbacks and permit the gauge to operate correctly. Adjustment of the valve 27 is made by removing the air chamber 16' and then checking the gauge with the air chamber 16' in place this procedure being followed until the proper opening is determined. Once the proper opening is determined no further adjustment of the valve 27 is necessary. The valve 27 has a slotted head 30 and a central port 31 communicates with the transverse port 32, whereby air leaving the chamber 16 will pass through the valve housing 26 to impinge upon the gasket seal 33, which is mounted on the shaft 34 at one end thereof, and a gasket 35 is mounted in the seal 33 to engage the truncated conical end 36 of the tubular outlet valve housing 37, which is provided with outlet ports 38, and a spring 39 interposed between the housing 26 and seal 33 forces the gasket against the conical end to prevent air from escaping from the chuck 10. The shaft, at its outer end, has the corrugated deflector button 39' secured thereto by a set screw 40. The button 39' is slidably mounted in the recess 41 in the chuck 10, and the bottom of the button and recess 41 are bevelled to retain the button therein.

It will be noted that a gasket 42 and the disc 43, with the central aperture 44, is interposed between the end of the chamber 16 and chuck 10, when these two members are threadedly connected together.

In use, the chuck is placed on the valve stem of the tire to determine the amount of air pressure in the tire. If it is low, air is admitted into the tire by an air chuck. It is again tested, and if the pressure is too high, the pressure is bled from the tire by depressing the button 39'. As the air escapes, the gauge 19 will retract until the proper pressure is reached, when the button is released and the gauge removed from the valve stem.

There has thus been provided a gauge which will properly test the air pressure in a pneumatic tire, and will bleed the air from the tire if necessary, to obtain the right pressure in the tire, the gauge at all times indicating the pressure in the tire until the right pressure is reached.

It is believed that from the foregoing description, the operation and construction of the invention will apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A valve structure for relieving pressure from a tire gauge comprising a casing having an open ended chamber, an inlet passage to said chamber and an outlet bore from said chamber, a cup-shaped valve housing mounted in the chamber end of said bore, a manually adjustable valve in said housing cooperating with a seat therein to control flow through said bore, a second valve housing in the opposite end of said bore having a seat thereon, a valve seal in said bore cooperating with said last mentioned seat for controlling flow through said bore, a spring interposed between said valve seal and said first housing urging said seal against its seat, a stem on said valve seal extending through and beyond said second housing, a button on the free end of said stem for manual opening of said valve seal.

THOMAS E. PARROTT.

REFERENCES CITED

The following references are of record in the file of this patent:

UNITED STATES PATENTS

| Number | Name | Date |
| --- | --- | --- |
| 898,213 | Gibson | Sept. 8, 1908 |
| 1,160,285 | Hobbs | Nov. 16, 1915 |
| 1,334,874 | Miller | Mar. 23, 1920 |
| 1,891,853 | Turner | Dec. 20, 1932 |
| 2,228,481 | Parsons | Jan. 14, 1941 |

FOREIGN PATENTS

| Number | Country | Date |
| --- | --- | --- |
| 328,750 | France | of 1904 |
| 512,073 | France | of 1920 |